(12) United States Patent
Fender et al.

(10) Patent No.: US 9,444,254 B2
(45) Date of Patent: Sep. 13, 2016

(54) BYPASS SWITCH FOR A BOOST DEVICE

(75) Inventors: Karl Eric Fender, Greenwood, SC (US); Clay L. Fellers, Little Mountain, SC (US)

(73) Assignee: Cooper Technologies Company, Houston, TX (US)

( * ) Notice: Subject to any disclaimer, the term of this patent is extended or adjusted under 35 U.S.C. 154(b) by 767 days.

(21) Appl. No.: 13/597,832

(22) Filed: Aug. 29, 2012

(65) Prior Publication Data

US 2013/0049728 A1 Feb. 28, 2013

Related U.S. Application Data

(60) Provisional application No. 61/528,881, filed on Aug. 30, 2011.

(51) Int. Cl.
*G05F 3/18* (2006.01)
*H02J 3/18* (2006.01)
*G05F 3/22* (2006.01)

(52) U.S. Cl.
CPC ............... *H02J 3/1828* (2013.01); *G05F 3/18* (2013.01); *G05F 3/22* (2013.01); *Y02E 40/30* (2013.01)

(58) Field of Classification Search
CPC .............. G05F 3/18; G05F 3/22; G05F 1/56; G05F 1/70; Y02E 40/30
USPC .......................................... 323/205, 210, 311
See application file for complete search history.

(56) References Cited

U.S. PATENT DOCUMENTS

| | | | |
|---|---|---|---|
| 4,636,708 A * | 1/1987 | Whyte | 323/210 |
| 4,999,565 A | 3/1991 | Nilsson | |
| 5,631,545 A * | 5/1997 | Norman et al. | 323/205 |
| 2009/0128100 A1* | 5/2009 | Yasuda et al. | 323/205 |

FOREIGN PATENT DOCUMENTS

| | | | |
|---|---|---|---|
| CA | 2428273 A | 5/2002 | |
| CN | 100413206 A | 8/2008 | |
| CN | 102130458 A | 7/2011 | |
| DE | 2228042 A | 1/1974 | |
| WO | WO9424622 A | 10/1994 | |
| WO | WO2011000425 A | 1/2011 | |

OTHER PUBLICATIONS

International Search Report and Written Opinion for International Application No. PCT/US12/52757, mailed Jan. 25, 2013.
Taylor, C., "Preventing Blackouts," PowerPoint Presentation, IEEE/PES 2004 General Meeting, Panel Session on Major Grid Blackouts of 2003, Denver, Jun. 8, 2004, 31 pages.

(Continued)

*Primary Examiner* — Yemane Mehari
(74) *Attorney, Agent, or Firm* — Fish & Richardson P.C.

(57) ABSTRACT

A boost device is coupled to a compensation device that is configured to be connected to a power system. The boost device includes multiple portions, each of the multiple portions including at least one electrical element, and a solid-state switching device electrically connected to the at least one electrical element. The solid-state switching device is connected in parallel with the at least one electrical element such that closing the solid-state switching substantially prevents current flow to the at least one electrical element.

17 Claims, 7 Drawing Sheets

(56) References Cited

OTHER PUBLICATIONS

Bruns, D.P., et al., "Shunt Capacitor Bank Series Group Shorting (CAPS) Design and Application," IEEE Transactions on Power Delivery, vol. 16, No. 1, Jan. 2001, 9 pages.

Minder, P.M., "Intermittently Increased Kilovar Output of Large Capacitor Banks," Power Apparatus and Systems, Part III, Transactions of the American Institute of Electrical Engineers, vol. 74, No. 3, Jan. 1955, pp. 749-752.

Nelson, J.H., "Discussion of 'Shunt Capacitor Bank Series Group Shorting (CAPS) Design and Application'," IEEE Transactions on Power Delivery, vol. 16, No. 4, Oct. 2001, 2 pages.

Taylor, C.W., and Van Leuven, A.L., "CAPS: Improving Power System Stability Using the Time-Overvoltage Capability of Large Shunt Capacitor Banks," IEEE Transactions on Power Delivery, vol. 11, No. 2, Apr. 1996, 10 pages.

Extended European Search Report for European Application No. 12827925A, issued Jul. 16, 2015.

Communication Pursuant to Article 94(3) EPC for European Application No. 12827925.4, issued May 2, 2016.

Office Action for Taiwan Application No. 101131402, issued Feb. 17, 2016.

Office Action for Pakistan Application No. 58212012, issued before May 14, 2014.

\* cited by examiner

BYPASS SWITCH FOR A BOOST DEVICE

CROSS-REFERENCE TO RELATED APPLICATION

The present application claims priority from U.S. Provisional Application Ser. No. 61/528,881, filed Aug. 30, 2011. The contents of the prior application are incorporated herein by reference in their entirety.

TECHNICAL FIELD

This disclosure relates to a bypass switch for a boost device.

BACKGROUND

A Static VAR Compensator (SVC) may be used in a power system to provide reactive power support in response to emergency system contingencies.

SUMMARY

A solid state switching device is connected in parallel with an electrical component of a portion of a boost device, such as a capacitor or inductor bank, that is included in a compensation device that is connected to a power system. The boost device may include numerous smaller devices or components connected in series or parallel. The compensation device includes the boost device and an electrical element, such as a capacitor, in series with the boost device. Short circuiting some of the portions of the boost device results in an increase of the voltage on un-shorted portions of the boost device, an increase of the voltage on other electrical elements in series with the boost device, and an increase in the output or VARs of the compensation device. For a capacitor bank, the increase is in capacitive VARs and for an inductor bank, the increase is in inductive VARs. The additional VAR output by the compensation device may be used to increase or decrease the voltage in the power system as needed due to an emergency condition. The solid state switching device closes rapidly, thus allowing the compensation device to rapidly increase its VAR output.

A mechanical switch may be connected in parallel with the solid state switch to provide a current bypass to the solid state switch, to reduce steady state losses or to allow the use of a solid state switch with a lower current rating without the need for bulky and expensive cooling equipment. The mechanical switch may be referred to as a mechanical bypass switch. \

In one general aspect, a system includes a compensation device for connection to a bus of a power system, and a boost device coupled to the compensation device, the boost device including multiple portions, each of the multiple portions including at least one electrical element, and a solid-state switching device electrically connected to the at least one electrical element, where the solid-state switching device is connected in parallel with the at least one electrical element such that closing the solid-state switching substantially prevents current flow to the at least one electrical element.

Implementations may include one or more of the following features. The boost device may include a mechanical bypass switch electrically connected in parallel to the solid state switching device and the at least one electrical element. The solid state switching device may be configured to close in response to a system contingency. A discharge coil may be coupled to the mechanical bypass switch. The at least one electrical element may include multiple capacitors. The at least one electrical element may be a single capacitor. The at least one electrical element may include multiple components that, taken together, have an overall capacitive output. The at least one electrical element may include multiple inductors. The at least one electrical element may include multiple components that, taken together, have an overall inductive output.

The system also may include a connection configured to electrically connect the compensation device to the power system. The connection may be configured to electrically connect the compensation device to the power system through a circuit breaker that, when opened, disconnects the compensation device from the power system. The solid-state switching device may be a thyristor. The solid-state switching device may include one or more power electronic components. The solid-state switching device may be configured to close to short circuit the at least one electrical element, and the mechanical bypass switch may be configured to close after the solid-state switching device is closed. The solid-state switching device may be configured to open after the mechanical bypass switch is closed. The solid-state switching device may close within about one cycle and the mechanical bypass switch may close after the solid-state switching device closes.

In some implementations, the system may include a monitor configured to monitor current flow through the thyristor and to provide a signal to cause the mechanical bypass switch to close when current flows through the thyristor. The monitor may include a current sensing device. The system may include a control system coupled to the solid-state switching device. The control system may be configured to provide a signal to cause the solid-state switching device to open or close. The control system coupled to the solid-state switching device may be configured to provide a signal to cause the solid-state switching device to open and close, and to provide a signal to cause the mechanical bypass switch to open and close.

In another general aspect, a compensation device for connection to a bus of a power system includes a boost device, the boost device includes one or more portions, each portion includes multiple electrically connected capacitors, a solid-state switching device electrically connected in parallel to the multiple electrically connected capacitors, and a connection interface configured to electrically connect the compensation device to the bus of the power system. Closing the solid-state switching device of one of the one or more portions short circuits the capacitors of the portion and causes a voltage on the capacitors of another of the portions to increase, thereby increasing the VARs provided by the compensation device to the power system through the connection interface. At least one of the one or more portions may include a mechanical bypass switch electrically connected in parallel to the solid-state switching device and the multiple capacitors.

In another general aspect, a method for providing VARs to a power system includes receiving a triggering signal, and causing a solid-state switching device in a portion of a boost device of a compensation system connected to the power system to close in response to receiving the triggering signal, the closing of the solid-state switching device resulting in an electrical element included in the boost device to be short circuited and a VAR output from the compensation device to change.

Implementations may include one or more of the following features. A mechanical bypass switch electrically connected in parallel with the solid-state switching device may be caused to close after the solid-state switching device is closed.

In another general aspect, a kit for installing a boost device in a compensation device includes a solid-state switching device, a fitting to connect the solid-state switching device such that the solid-state switching device is in parallel with a capacitor or inductor of the boost device, and a control system coupled to the solid-state switching device, the control system configured to produce a signal to cause the solid-state switching device to open or close.

Implementations may include one or more of the following features. A mechanical bypass switching device may be electrically connected in parallel with the solid-state switching device and coupled to the control system, and the control system may be further configured to produce a signal to cause the mechanical bypass switching device to open or close. The boost device may be a capacitor bank that includes multiple capacitive components. The boost device may be an inductor bank that includes multiple inductive components. The kit may include a monitor configured to measure current flowing through the solid-state switching device, where the monitor is coupled to the control system.

In another general aspect, a boost device includes multiple portions, each of the multiple portions including at least one electrical element, and a solid-state switching device electrically connected to the at least one electrical element, where the solid-state switching device is connected in parallel with the at least one electrical element such that closing the solid-state switching device substantially prevents current flow to the at least one electrical element.

Implementations of the described techniques may include hardware, a method or process, a device, an apparatus, a system, a compensation device, a computer program product, a controller, a control system, or a user interface configured to allow a user to communicate with a process described above. The details of one or more implementations are set forth in the accompanying drawings and the description below. Other features will be apparent from the description and drawings, and from the claims.

DESCRIPTION OF THE DRAWINGS

Like reference numbers indicate like elements.

DETAILED DESCRIPTION

A capacitor bank is typically constructed of multiple capacitor groups connected in series. A solid-state switching device, such as a thyristor, another solid state switch that has a non-linear resistance and is suitable for use in a power system, or any other power electronic component, is used to short circuit a portion or portions of a capacitor bank to rapidly boost the VARs delivered by the capacitor bank. The solid state switching device also may be referred to as a solid-state switch. Short circuiting one or more portions of the capacitor bank forces the un-shorted portions to operate at a higher voltage. The un-shorted portions are in series with the shorted portion or portions. The delivered VARs of the un-shorted portions or groups rises as a result and rapidly provides additional VAR under system contingency conditions, which may result from a loss of a transmission line or a malfunction of a generator.

After the solid state switching device closes to short the capacitor group, the solid state switching device may be bypassed by a mechanical switching device. Bypassing the solid state switching device may minimize or eliminate the losses in the solid state switching device and the need for forced cooling of the solid state switching device. Bypassing the solid state switching device also may allow the use of a solid state switching device with a lower steady state current rating than would be necessary without the bypass switch. The capacitor bank with the solid state switch and the mechanical bypass switch may be used under contingency conditions where SVCs may be used, without requiring bulky or expensive cooling equipment. Further, a power system that includes multiple capacitor or inductor banks with the solid state switch may provide a distributed network of compensation devices that are capable of delivering additional VARs directly to a region of the power system that needs additional VARs.

Figure 1A:
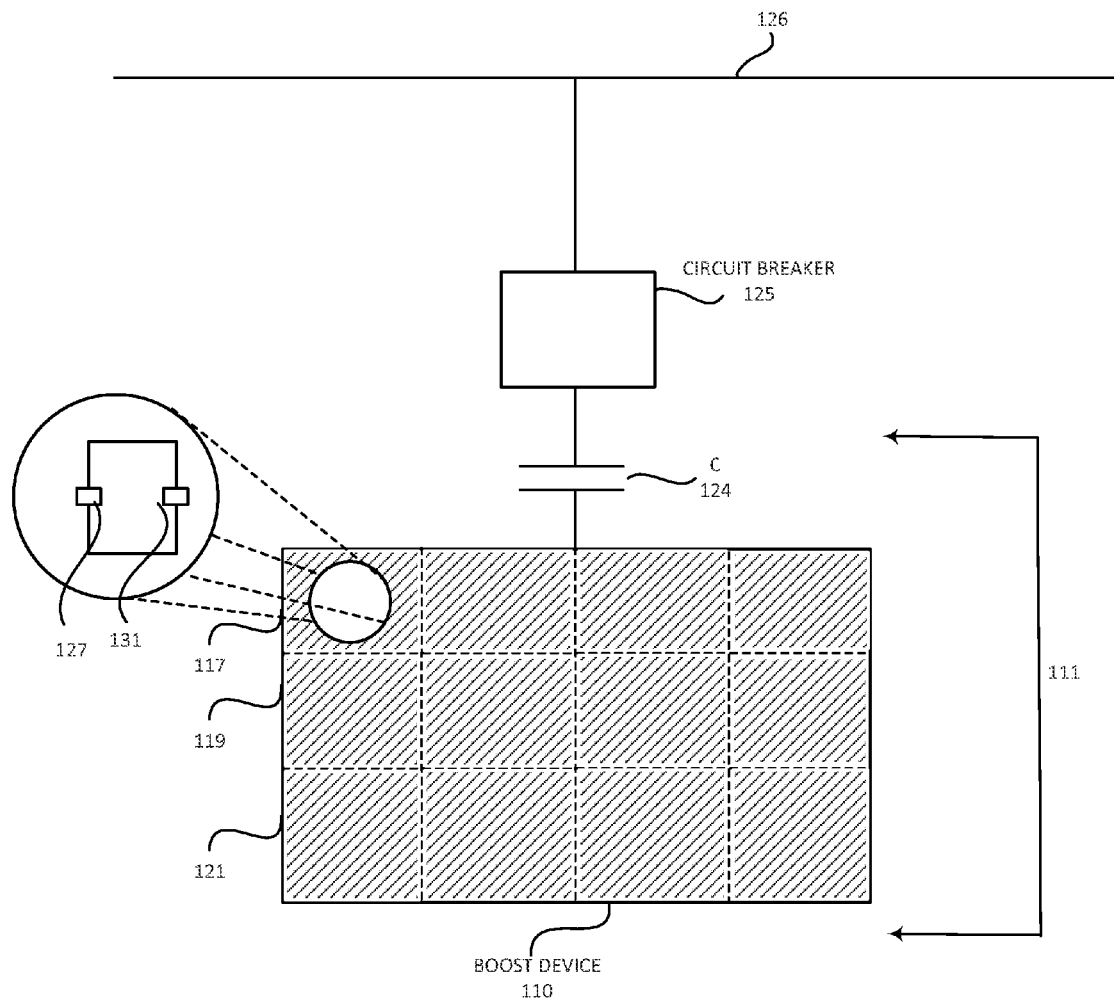
FIG. 1A shows an example system that includes a compensation device that includes a boost device.

FIG. 1A shows an example system 100A that includes a boost device 110. Together, the boost device 110 and a capacitor 124 form a compensation device 111. Shorting some or all of the portions of the boost device 110 increases the voltage on the un-shorted portions of the boost device 110 and on the capacitor 124, thereby increasing the VAR output of the capacitor 124 and the VAR output of components that typically have a capacitive output and are included in the un-shorted portions of the boost device 110.

The boost device 110 may be, for example, a capacitor bank or an inductor bank. In the implementation shown in FIG. 1A, the boost device 110 is a capacitor bank that may include inductors or other electrical elements but has an overall output that is capacitive. In other words, the overall output of the boost device 110 is capacitive. The compensation device 111 provides reactive power to a power system that includes a bus 126. The power system may be, for example, an electrical grid, an electrical system, or a multi-phase electrical network that provides electricity to commercial and residential customers. The power system may have an operating voltage of at least 1 kV and may be a medium-voltage, high-voltage, or ultra-high voltage power system. For example, the power system may have an operating voltage of at least 69 kV. The power system may operate at a fundamental frequency of, for example, 50 Hz or 60 Hz. An emergency contingency may occur when the operating voltage falls to less than 0.95 per unit of the nominal operating voltage of the power system.

The boost device 110 includes portions 117, 119, and 121, each of which includes at least one electrical element. In the example shown in FIG. 1A, the compensation device 110 is connected to the bus 126 through a circuit breaker 125. The circuit breaker 125 may be a switch that, when opened, breaks the connection between the compensation device 111 and the bus 126 to remove the entire compensation device 111 from the system 100A.

In the example shown in FIG. 1A, the portion 117 of the boost device 110 includes a solid state switch 127 and an electrical element 131. The electrical element 131 may include many components, some of which may be purely capacitive, and some of which may be inductive or resistive. In implementations in which the boost device 110 is a capacitor bank, the overall output of the electrical element 131 and of the portions 117, 119, and 121 is capacitive.

The solid state switch 127 is electrically connected in parallel with the electrical element 131. The solid state switch 127 may be, for example, a thyristor. The solid state switch 127 may include multiple thyristors. Although not shown in FIG. 1A, each of the portions 119 and 121 also may include a solid state switch.

During ordinary operation of the system 100A, the solid state switch 127 is open such that current flowing from the bus 126 reaches the electrical element 131 to create a voltage across the electrical element 131. Certain emergency events, such as a loss of a transmission line or a malfunction of a generator, may cause a decrease in the voltage in the power system and on the bus 126, and, as a result, the VAR output of the compensation device 111 also decreases. Because the voltage of the power system decreases, the power system may become unstable unless VARs are injected into the power system by the compensation device 111 to compensate for the voltage decrease. Short circuiting the electrical element in some or all of the portions 117, 119, 121 of the boost device 110 may result in an increase, or boost, in the VAR output by the un-shorted parts of the boost device 110 and by the capacitor 124. In other words, short circuiting all or some of the portions 117, 119, 121 of the boost device 110 results in an increase in the VAR output of the compensation device 111.

Therefore, short circuiting the electrical element in the one or more of the portions 117, 119, 121 of the boost device 110 may allow the compensation device 111 to provide additional VARs to the power system. As such, by short circuiting the electrical components in some of the portions 117, 119, 121 of the boost device 110 in response to the occurrence of an emergency event, some other contingency, an input signal or any triggering event, the compensation device 111 may provide additional VARs to the power system to compensate for the decrease in voltage on the power system. Further, because the solid state switch 127 has a short switching time such as about 1 cycle or less, the boost device 110 is able to provide additional VARs shortly after the decrease in voltage in the power system or other contingency.

In instances where the boost device 110 is a capacitor bank, and the electrical elements 131 are capacitors, the delivered VARs of the un-shorted portions in series with the shorted portion 117 rises by the square of the applied voltage. Thus, in this example, when the capacitor 131 of the portion 117 is shorted, the VAR output of the portions 119 and 121 and of the capacitor 124, rises as the square of the applied voltage, and the compensation device 111 provides additional VARs to the power system.

Figure 1B:
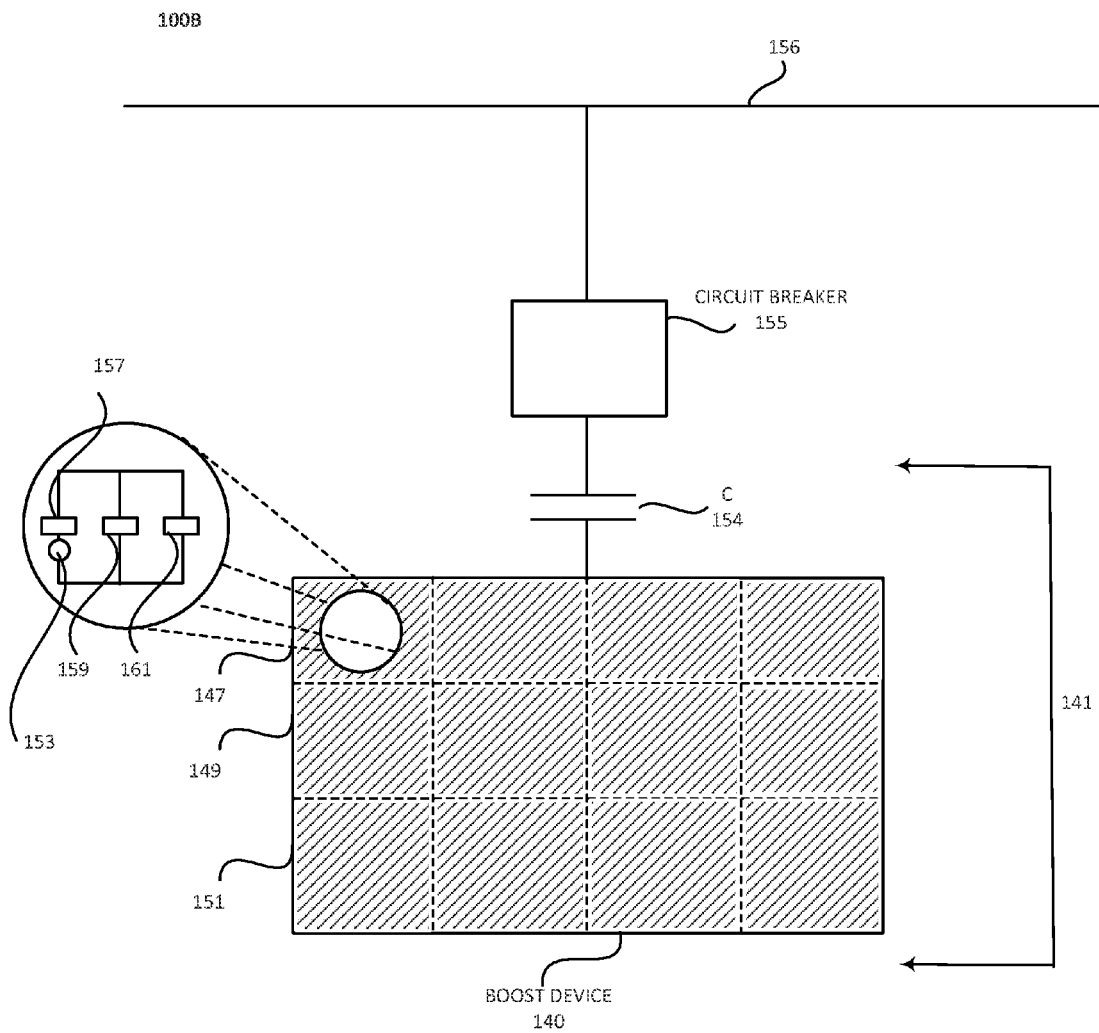
FIG. 1B shows an example system that includes a compensation device that includes a boost device with a mechanical bypass switch.

FIG. 1B shows another example of a system 100B that includes a compensation device 141 and a boost device 140. The boost device 140 includes portions 147, 149, and 151. As compared to the boost device 110, one or more portions of the boost device 140 may include a mechanical bypass switch 159 in parallel with a solid state switch 157 and an electrical element 161. The solid state switch 157 may be similar to the solid state switch 127, and the electrical element 161 may be similar to the electrical element 131. The portion 147 illustrates an example arrangement with a mechanical bypass switch 159 and a monitor 153 that is in series with a solid state switch 157.

During ordinary operation of the system 100B, the solid state switch 157 and the mechanical bypass switch 159 are open such that current flowing from the bus 156 reaches the electrical element 161 to create a voltage across the electrical element 161. After the occurrence of a contingency, the electrical element 161 in the portion 147 is shorted such that the compensation device 141 provides additional VARs to the power system.

The solid state switch 157 is closed to short circuit the electrical element 161. After the solid state switch 157 is closed, current flows through the solid state switch 157, and the monitor 153 detects the current and produces a signal that may be used to cause the mechanical bypass switch 159 to close. The mechanical bypass switch 159 may close in response to the signal from the solid state switch 157 or in response to a signal from another device (not shown) that is external to the mechanical bypass switch 159. When closed, the mechanical bypass switch 159 acts as a bypass to the solid state switch 157 and diverts current away from the solid state switch 157. The solid state switch 157 may be lossy and, thus, current flow through the solid state switch 157 may generate a substantial amount of losses and heat. The presence of the mechanical bypass switch 159, which, when closed, diverts current around the solid state switch 157, reduces the amount of loss and heat generated by the solid state switch 157 and may allow the use of a solid state switch 157 that has a continuous current rating lower than would otherwise be necessary without the need for bulky and expensive cooling equipment.

The mechanical bypass switch 159 may be a relatively slow switch as compared to the solid state switch 157. For example, the mechanical bypass switch 159 may close in a time greater than one cycle. For example, the mechanical bypass switch 159 may have a closing time of about five cycles). The mechanical bypass switch 159 may be, for example, a vacuum interrupter, a circuit breaker (interrupted by vacuum, oil, or SF6), or an air-insulated disconnect switch.

Figure 2:
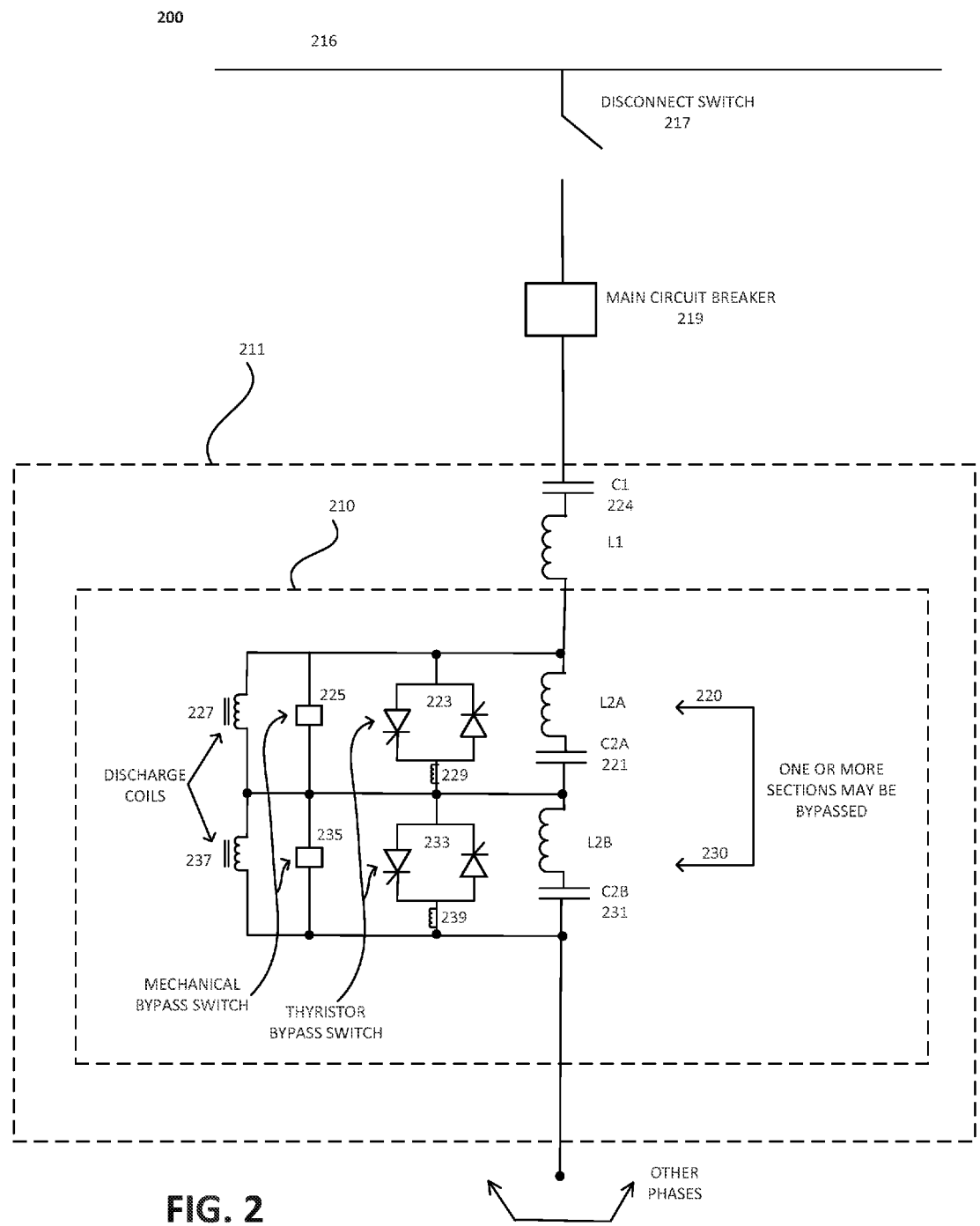
FIG. 2 shows an example system that includes a compensation device that includes a capacitor bank.

FIG. 2 shows another example implementation of a system 200 that includes a boost device 210. In this example, the boost device 210 is a capacitor bank that includes inductors for current limiting. The capacitor bank 210 is part of a compensation device 211 that is connected to a bus 216 of an electrical power system. The compensation device 211 is connected to the bus 216 through a disconnect switch 217 and a main circuit breaker 219. The compensation device 211 includes the capacitor bank 210, a capacitor 224 (represented by C1), and an inductor L1. The inductor L1 is used for current limiting and/or for tuning the compensation device 211. The disconnect switch 217 and the main circuit breaker 219 may be opened to remove the compensation device 211 from the power system.

The capacitor bank 210 includes portions 220 and 230. The portion 220 includes a capacitive electrical element 221 (represented by capacitor C2A), an inductor L2A, a thyristor bypass switch 223, a mechanical bypass switch 225, a discharge coil 227, and a current transformer 229. The portion 230 includes a capacitive electrical element 231 (represented by capacitor C2B), a thyristor bypass switch 233, a mechanical bypass switch 235, a discharge coil 237, and a current transformer 239.

The capacitive electrical elements 221 and 231 may include multiple capacitors arranged in series and/or in parallel. Each of the capacitive electrical elements 221 and 231 may include a different number of capacitors or capacitive components. For example, each of the capacitive electrical elements 221 and 231 may include between, for example, about eight and thirty capacitors in parallel and/or between about one and eight capacitors in series. Other suitable configurations that include more or fewer capacitors may be used. Portions 220 and 230 may include purely capacitive components and components that are not purely capacitive but the overall output of the portions 220 and 230 is capacitive. The inductors L2A and L2B protect the thyristor bypass switches 223 and 233, respectively. The inductors L2A and L2B may also provide tuning and current limiting in conjunction with the inductor L1. The inductors L2A and L2B are selected to provide an appropriate amount of current limiting and tuning. The current transformers 229 and 239 sense current flow through the thyristor bypass switches 223 and 233. Although the example in FIG. 2 shows current transformers, the elements 229 and 239 may be any suitable device that measures or senses current flow. For example, a Rogowski coil may be used instead of, or in addition to, a current transformer.

The thyristor bypass switches 223 and 233 may include multiple thyristor switches arranged in any suitable manner that allows their respective capacitive electrical elements 221 and 231 to be short circuited in an AC circuit. The discharge coils 227 and 237 discharge or drain away a DC offset that may be applied to the thyristor bypass switches 223 and 233 or the capacitive electrical element 221 and 231 after opening the thyristor switch and the mechanical bypass switch to force the current through the capacitive electrical elements 221 and 231.

Under normal operating conditions, the thyristor bypass switches 223 and 233 and the mechanical bypass switches 225 and 235 are open and the voltage on the capacitor bank 210 is split between both of the portions 220 and 230. When an emergency contingency situation occurs, either or both of the capacitive electrical element 221 or 231 may be short circuited by closing the thyristor bypass switch 223 or 233, respectively. The current may be diverted from the thyristor bypass switch by closing the mechanical switch. Shorting one or both of the capacitive electrical elements 221 or 231 increases the VAR output of the compensation device 211. These additional VARs may be provided to the power system in response to a contingency event occurring.

Figure 3:
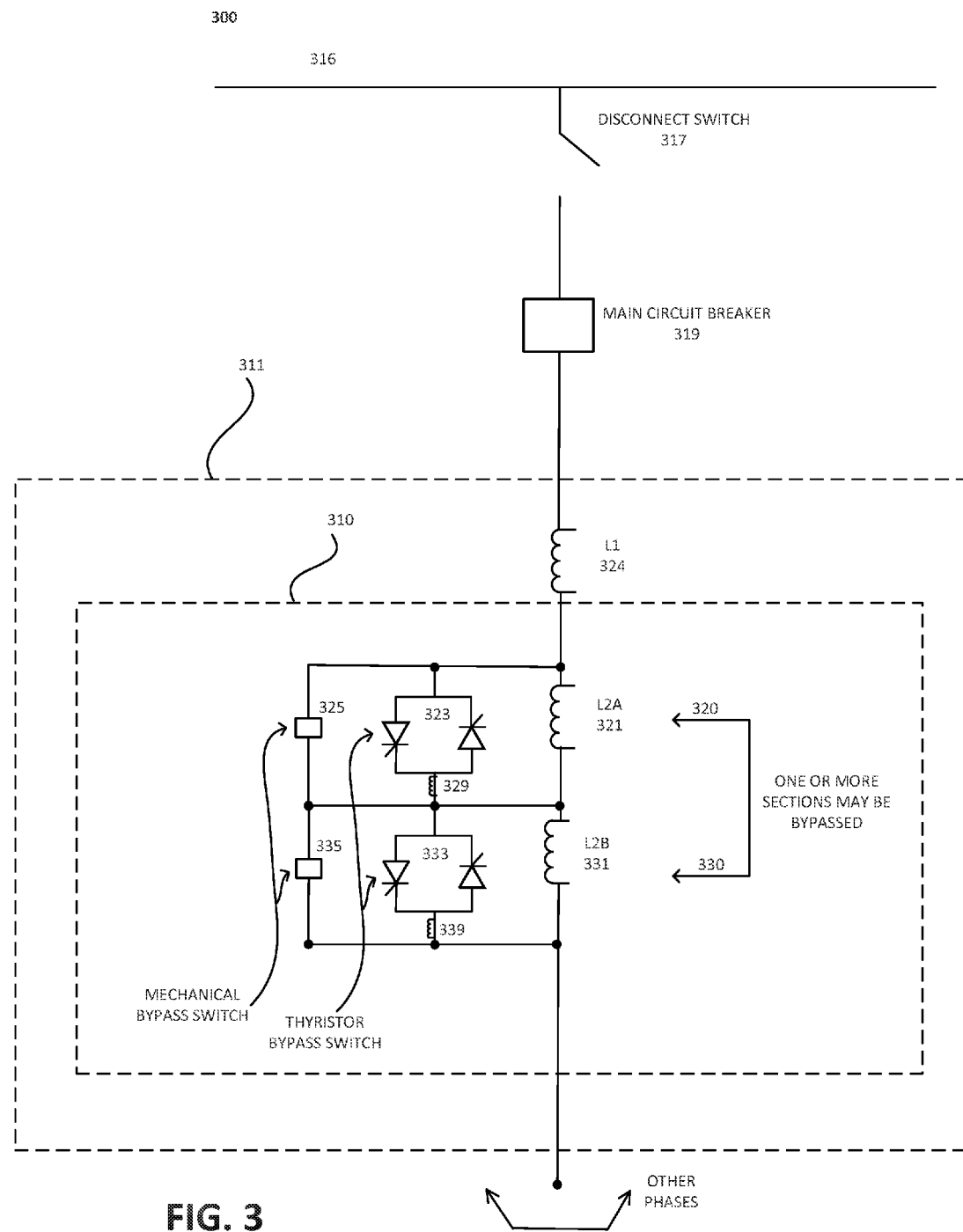
FIG. 3 shows another example system that includes a compensation device that includes an inductor bank.

FIG. 3 shows an example system that includes a compensation device that includes an inductor bank. The system 300 includes a compensation system 311 that is connected to a bus 316 of a power system through a disconnect switch 317 and a main circuit breaker 319. The compensation system 311 includes a boost device 310. The boost device 310 includes an inductor bank that has portions 320 and 330. The portion 320 includes an inductive (or reactive) electrical element 321, a thyristor switch 323, a mechanical bypass switch 325, and a current transformer 329. The portion 330 includes an inductive electrical element 331, a thyristor switch 333, a mechanical bypass switch 335, and a current transformer 339. The current transformers 329 and 339 sense current flow through the thyristor bypass switches 323 and 333. Although the example in FIG. 3 shows current transformers, the elements 329 and 339 may be any suitable device that measures or senses current flow. For example, a Rogowski coil may be used instead of, or in addition to, a current transformer. The portions 320 and 330 include inductive electrical elements 321 and 331 and also may include many components, some of which may be purely capacitive or resistive; however, but the overall output of the portions 320 and 330 is inductive.

During normal operation, the thyristor switches 323 and 333 and the mechanical bypass switches 325 and 335 are open and current flows through the inductive electrical elements 321 and 331. In response to a system contingency, the inductive electrical elements 321 and/or 331 are shorted, which increases the inductive VAR output of the un-shorted portion of the boost device 310 and the inductor 324. As a result, the inductive VAR output of the compensation device 311 is increased.

Figure 4:
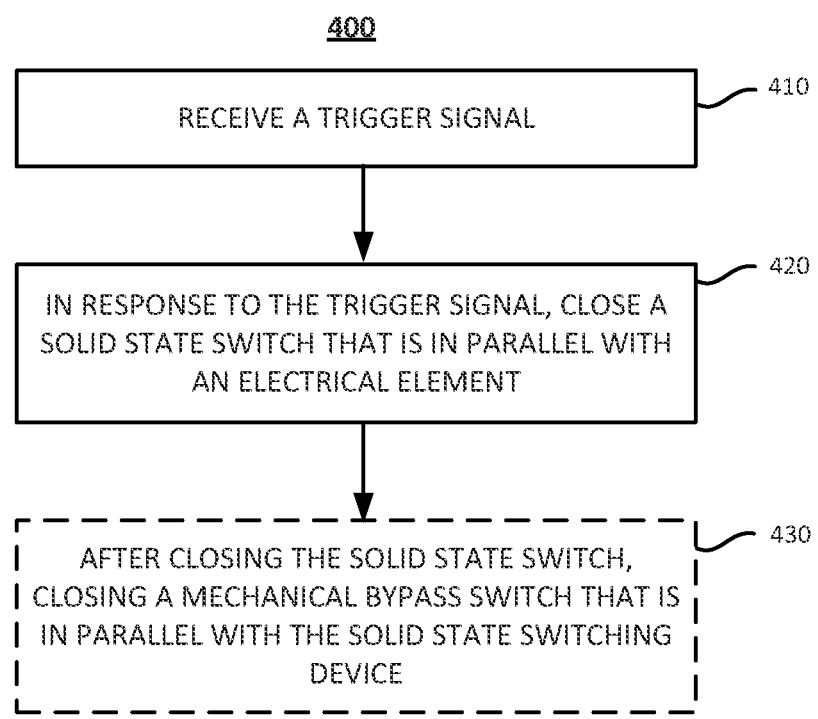
FIG. 4 shows an example process for increasing the VAR output of a compensation device.

FIG. 4 shows an example process 400 for increasing the VAR output of a compensation device that includes a boost device. The process 400 is discussed with respect to system 100A shown in FIG. 1A. However, the process 400 may be performed on the system 100B, 200 or 300, or on any compensation device having a boost device that includes multiple portions that have electrical elements that may be short circuited by a solid state switch. The process 400 may be performed on one or more electronic processors included in one or more components of the systems 100A, 100B, 200, or 300 or by a processor external to the system but in communication with the system. The process 400 may be performed by one or more controllers that are in communication with the components of the systems 100A, 100B, 200 or 300.

A trigger signal is received (410). The trigger signal may be a signal that is generated in response to the occurrence of a contingency, such as a decrease in system voltage, a loss or failure of a piece of equipment connected to the power system, a response to needed VAR support, or a planned outage of a portion of the power system. The trigger signal may be an indication that a decrease in the voltage of the power system has been detected. For example, a detection that the voltage on the bus 126 has dropped below a threshold of about 100 kV may be used as an indicator that an emergency condition exists and that the compensation device 111 is to produce additional VARs for injection onto the power system.

The trigger signal may be a signal from an external device, such as an electronic processor that executes an automated process to monitor the power system. The trigger signal may be a signal from another electrical device, such as a large load (for example, the activation of a furnace transformer or a large part of the power system) or a generator that is coupled to the power system. The trigger signal may be a signal that is received from a malfunctioning device on the power system. The trigger signal may be a signal that is manually generated by human who monitors the power system and causes generation of the signal upon receiving an indication that an emergency event has occurred.

In response to receiving the trigger signal, the solid state switch 127 is closed (420). Closing the solid state switch 127 causes the electrical element 131 that is in parallel with the solid state switch 127 to short circuit such that current that typically flows to the electrical element 131 is diverted to flow through the solid state switch 127. The electrical elements in the portions 119 and 121 of the boost device 110 remain un-shorted, and the VAR output of the electrical elements of these portions increases, as does the VAR output of the capacitor 124 and the VAR output of the compensation device 111. In this example, the electrical elements of the boost device 110 are cumulatively capacitive, and the VAR output of the electrical elements of the un-shorted portions 119 and 121 increases by the square of the applied voltage. The electrical elements of the boost device 110 in this example are cumulatively capacitive. Thus, the overall output of the boost device 110 is capacitive although the boost device 110 may include resistive and inductive components.

In some implementations, the solid state switch 127 closes within 1 cycle or less of receiving the trigger signal.

In implementations, such as the implementation shown in FIG. 1B, that include a mechanical bypass switch in parallel with the solid state switch, the mechanical bypass switch 159 closes after the solid state switch 157 closes (430). Referring to FIG. 1B, closing the mechanical bypass switch 159 diverts current away from the solid state switch 157, thus reducing the amount of losses and heat that is generated by current flowing through the solid state switch 157. In other words, when closed, the mechanical bypass switch 159 acts as a bypass to both the electrical element 161 and the solid state switch 157. The mechanical bypass switch may also allow the use of a solid state switch with a lower steady state lower current rating than would otherwise be necessary without having a mechanical bypass switch. The mechanical bypass switch 159 may close in a time greater than one cycle. In some implementations, the mechanical bypass switch 159 closes in response to a signal that indicates that current is flowing through the solid state switch 157. Such a signal may be generated by, for example, a current sensing device such as a current transformer connected in series with the solid state switch 157, or a Rogowski coil positioned about a conductor connected to the solid state switch. In some implementations, the signal may be generated by electronics associated with the solid state switch 157. The signal that causes the mechanical bypass switch 159 to close may be generated by any other external device that is in communication with the mechanical switch 159. If current continues to flow through the solid state switch 157 after the mechanical bypass switch 159 was prompted to open, a signal may be generated to cause the solid state switch 157 to open. That is, if the mechanical bypass switch 159 fails to open in response to a signal to open, the solid state switch 157 may be opened. The signal to re-open the solid state switch 157 also may be generated by the current sensing device or by electronics associated with the solid state switch 157.

After determining that the voltage on the bus 156 has returned to a normal operating level, that the system contingency has been resolved, or by receiving any other external trigger, the short circuited electrical element 161 of the portion 157 may be reinserted into the boost device 140. The electrical element 161 may be reinserted (un-shorted) using either the solid state switch 157 or the mechanical bypass switch 159. If the mechanical bypass switch 159 is capable of opening under a load, the mechanical bypass switch 159 is opened and the electrical element 161 is reinserted and the boosted VAR output of the compensation device 141 ends when current stops flowing through the mechanical bypass switch 159.

If the mechanical bypass switch 159 is not capable of opening under a load, the solid state switch 157 is closed, and the mechanical bypass switch 159 is opened after the solid state switch 157 is closed. The solid state switch 157 is then opened, and the electrical element 161 is reinserted and the boosted VAR output of the compensation device 141 ends when current stops flowing through the solid state switch 157. The solid state switch 157 may be used to reinsert the electrical element 161 even if the mechanical bypass switch 159 is capable of opening under a load.

Referring to FIG. 1A, in implementations that do not include a mechanical bypass switch, the solid state switch 127 is used to break the load. Opening the solid state switch 127 reinserts the electrical element 131 is reinserted and ends the boosted VAR output of the compensation device 141.

Figure 5:
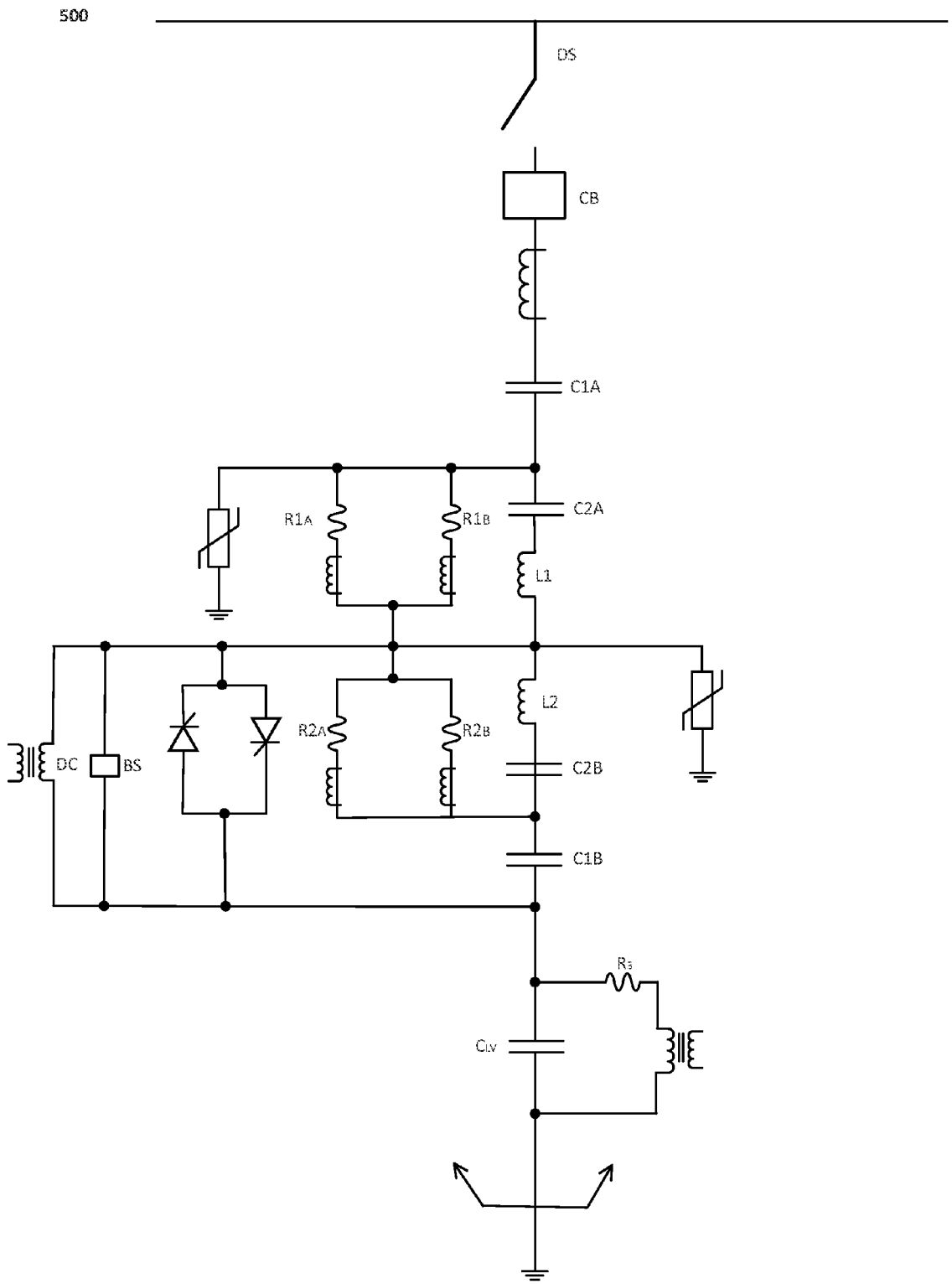
FIG. 5 shows another example system that includes a compensation device.

FIG. 5 shows another example system 500 that includes a compensation system with a boost device. In the system 500, the capacitor C2B may be about 300-330 microfarads (µF), the capacitor C1B may be about 30-50 µF, the capacitor C1A may be about 15-25 µF, and the capacitor C2A may be about 150-170 µF. In some implementations, the capacitor C2B is 315.68 µF, the capacitor C1B is 39.46 µF, the capacitor C1A is 19.73 µF, and the capacitor C2A is 157.84 µF. The inductor L1 may be about 64-65 milliHenries (mH), and the inductor L2 may be about 25-35 mH. In some implementations, the inductor L1 is 64.19 mH and the inductor L2 is 32.10 mH. The resistors R1A and R2A may be about 182 ohms, and the resistors R2A and R2B may be about 91 ohms.

Figure 6:
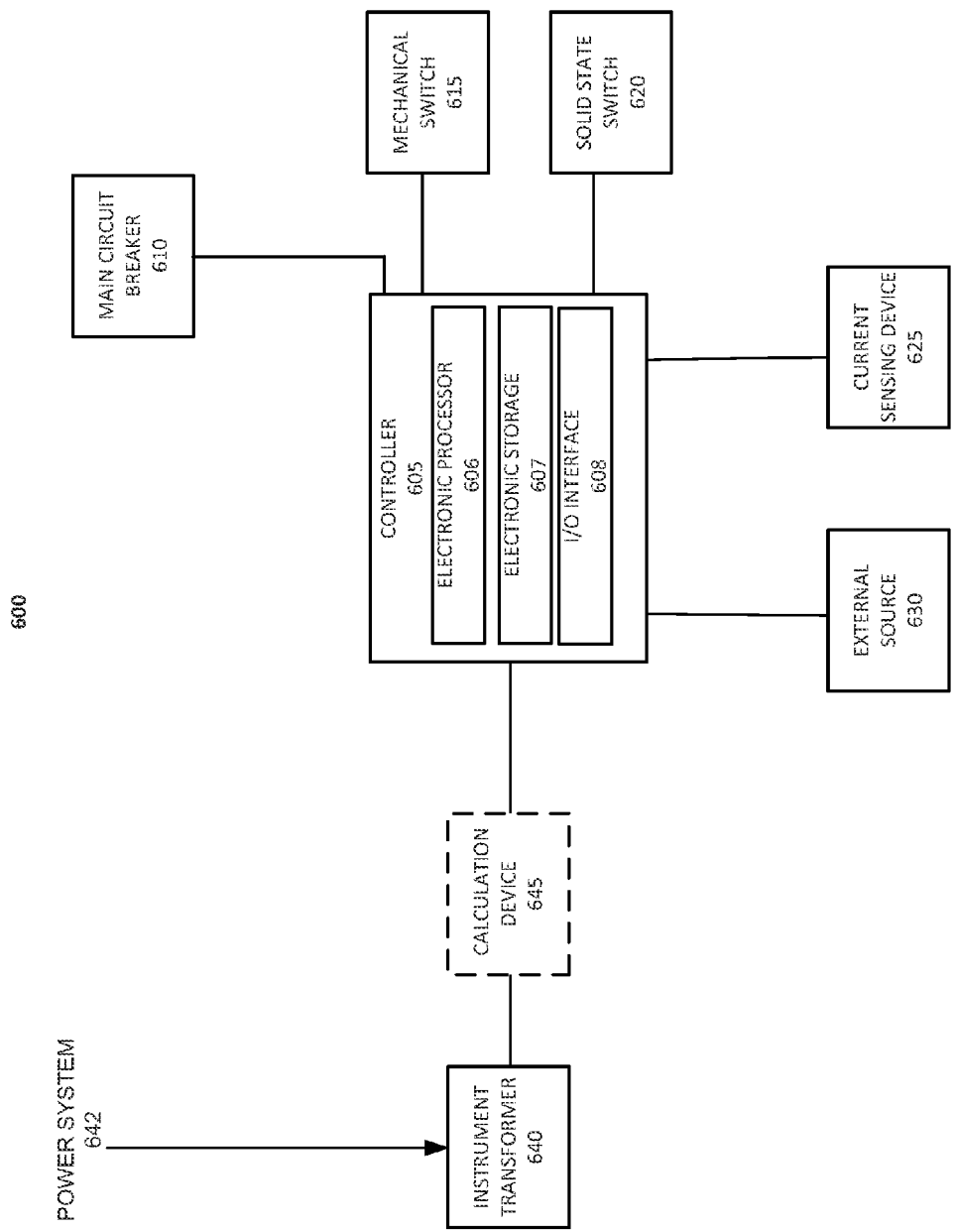
FIG. 6 shows an example of a control system for a boost device.

FIG. 6 shows an example of a control system 600 for a compensation device. The control system 600 includes a controller 605 that includes an electronic processor 606, an electronic storage 607, and an I/O interface 608. The electronic storage 607 may store instructions that, when executed by the electronic processor 606, cause the controller 605 to perform a process that is similar to the process 400 discussed above. The controller 605 may include more than one electronic processor and/or more than one electronic storage.

The controller 605 is coupled to and in communication with a main circuit breaker 610, a mechanical bypass switch 615 (in implementations that include a mechanical bypass switch), a solid state switch 620, a current sensing device 625, an external source 630, and an instrument transformer 640. The instrument transformer 640 may be connected to a device, such as calculation device 645 that is also connected to the controller 605.

The controller 605 may provide signals to the main circuit breaker 610 to cause the main circuit breaker 610 to open and close. The controller 605 may provide signals to the solid state switch 620 to cause the solid state switch 620 to open and close. In implementations that include the mechanical bypass switch 615, the controller 605 may provide signals to the mechanical bypass switch 615 that cause the mechanical bypass switch 615 to open and close. Further, the controller 605, may provide protection, feedback, output/input readings, and/or self diagnostics regarding the mechanical bypass switch 615 and/or the solid state switch 620, any of the elements connected to these switches (such as the electrical element 131 or 161 discussed with respect to FIGS. 1A and 1B), any of the boost devices discussed with respect to FIGS. 1A, 1B, 2, 3, and 5, and/or any of the compensation devices discussed with respect to FIGS. 1A, 1B, 2, 3, and 5. Further, the controller 605 may issue a command to the main circuit breaker 610 to open (or close) the main circuit breaker 610 to remove (or reinsert) the compensation system from (or into) the power system 642.

The mechanical bypass switch 615 may be similar to the mechanical bypass switches discussed above with respect to FIGS. 1B, 2, 3, and 5, and the solid state switch 620 may be similar to the solid state switches discussed above with respect to FIGS. 1A, 1B, 2, 3, and 5. The current sensing device 625 provides the controller 605 with an indication of an amount of current flowing through the solid state switch 620 and/or the mechanical bypass switch 615. The indication may be, for example, an amount of current or a digital value that indicates whether any current is flowing. The controller 605 may use the indication to determine whether to close or open one or more of the mechanical bypass switch 615 or the solid state switch 620. The controller 605 also controls the timing of the opening and closing using a process such as the process 400 discussed in FIG. 4.

The control system 600 also includes the external source 630. The external source 630 may be an external trigger that provides an electronic signal to the controller 605 for further processing. In this implementation, the controller 605 determines whether to (for example) open or close the mechanical bypass switch 615, the solid state switch 620, and/or the main circuit breaker 610 using the electronic signal from the external source 630. In some implementations, the external source 630 provides a signal to the controller 605 that causes the controller 605 to initiate a particular action. For example, the external source 630 may provide a signal generated by a human operator of the power system 642 to close the solid state switch 620 due to an emergency contingency. The external source 630 may provide a parameter that describes a condition of the power system 642 to the controller 605, and the controller 605 may determine an action based on the parameter.

The control system 600 also includes the instrument transformer 640. The instrument transformer 640 may be any device that is connected to the power system 642 and that produces measurements of, for example, voltage and current or other information about the power system 642. The information from the instrument transformer 640 is provided to the controller 605 in a form that is suitable for the controller 605 to process and determine a suitable action, for example, generating a signal that causes the solid state switch 620 to open. In some implementations, a calculation device 645 is connected to the instrument transformer 640 and the controller 605. The instrument transformer 640 provides a parameter or other information from the power system 642 to the calculation device 645, and the calculation device 645 determines a signal that is provided to the controller 605 and causes the controller 605 to take a particular action.

The controller 605 may be coupled to the various elements of the control system 600 by wired and/or wireless connections. For example, the various elements of the system 600 may be coupled to each other through one or more connections such as an RF link, Wi-Fi, Ethernet, transmission line, coaxial cable, and any other suitable connection. Although the example shown in FIG. 6 shows the controller 605 in communication with one mechanical bypass switch 615 and one solid state switch 620, the controller 605 may be in communication with multiple portions of a boost device, or all portions of a boost device. Further, a single controller 605 may be in communication with multiple boost devices.

The electronic storage 607 stores instructions, perhaps as a computer program, that, when executed by the electronic processor 606, causes the controller 605 to communicate with other components of the control system 600. For example, the electronic storage 607 may store control commands that determine whether to open the solid state switch 620. The electronic storage 607 also may store settings, for example, threshold voltage limits and maximum operating time, for one or more of the components of the control system 600, such as the solid state switch 620 and the mechanical bypass switch 615. The electronic storage 607 may be volatile memory, such as RAM. In some implementations, and the electronic storage 607 may include both non-volatile and volatile portions or components.

The electronic processor 606 may be a processor suitable for the execution of a computer program such as a general or special purpose microprocessor, an FPGA, or one or more processors of any kind of digital computer. Generally, a processor receives instructions and data from a read-only memory or a random access memory or both.

The input/output interface 608 provides an interface, physical, electronic, or both, that allows data and/or commands to be input to the controller 605 and/or read from the controller 605. The input/output interface 608 may receive data from a tactile device such as a keyboard, a mouse, a communications interface, or a display. The input/output interface 608 also may include software that allows communication between the controller 605, the components of the control system 600, and/or an external device (not shown).

A number of implementations have been described. Nonetheless, other implementations are within the scope of the claims. For example, in some implementations, more than one portion, or all of the portions, of the boost device 110, 140, 210, or 310 may be short circuited. In some implementations of a system such as the one shown in FIG. 1A, the capacitor 124 is not used. In these implementations, only some of the portions of the boost device are short circuited. The compensation device may include multiple boost devices in series.

Each of the various portions of the boost device may include a different number of electrical elements in a different arrangement. The various portions of the boost device may be configured differently and may include different components.

A controller that includes an electronic processor and an electronic storage may perform the process 400. The controller may be electrically connected to receive data and/or signals from the bus 126, the boost device 110 and/or components of the boost device 110.

The bus 126 may carry electrical signals having a fundamental frequency of, for example, 50, 60 Hz, 16.67 Hz, or 25 Hz. The bus 126 may carry electrical signals having a voltage of up to about 1,000 kV.

What is claimed is:

1. A system comprising:
    a compensation device connected to a bus of a power system; and
    a boost device coupled to the compensation device, the boost device comprising multiple portions, each of the multiple portions comprising:
        at least one capacitor or inductor;
        a solid-state switching device electrically connected in parallel to the at least one capacitor or inductor such that closing the solid-state switching device substantially prevents current flow to the at least one capacitor or inductor;
        a mechanical bypass switch electrically connected in parallel to the solid state switching device and the at least one capacitor or inductor such that closing the solid-state switching device substantially prevents current flow to the at least one capacitor or inductor; and
    a control system configured to:
        determine a system contingency is occurring;
        in response to determining that the system contingency is occurring, provide a signal to the solid-state switching device that causes the solid-state switching device to close;
        determine that current is flowing through the solid-state switching device;
        in response to determining that current is flowing through the solid-state switching device, provide a signal to the mechanical bypass switch that causes the mechanical bypass switch to close; and in response to providing the signal to the mechanical bypass switch that causes the mechanical bypass switch to close, provide a signal to the solid-state switching device that causes the solid-state switching device to open.

2. The system of claim 1, wherein the at least one capacitor or inductor comprises multiple capacitors.

3. The system of claim 1, wherein the at least one capacitor or inductor is a single capacitor.

4. The system of claim 1, wherein the at least one capacitor or inductor comprises multiple components that, taken together, have an overall capacitive output.

5. The system of claim 1, wherein the at least one capacitor or inductor comprises multiple inductors.

6. The system of claim 1, wherein the at least one capacitor or inductor comprises multiple components that, taken together, have an overall inductive output.

7. The system of claim 1, further comprising a connection configured to electrically connect the compensation device to the power system.

8. The system of claim 7, wherein the connection is configured to electrically connect the compensation device to the power system through a circuit breaker that, when opened, disconnects the compensation device from the power system.

9. The system of claim 1, wherein the solid-state switching device comprises a thyristor.

10. The system of claim 1, wherein the solid-state switching device comprises one or more power electronic components.

11. The system of claim 1, wherein the solid-state switching device closes within about one cycle and the mechanical bypass switch closes after the solid-state switching device closes.

12. The system of claim 1, further comprising a discharge coil coupled to the mechanical bypass switch.

13. A kit for installing a boost device in a compensation device, the kit comprising:
 a solid-state switching device;
 a fitting to connect the solid-state switching device such that the solid-state switching device is in parallel with at least one capacitor or inductor of the boost device such that closing the solid-state switching device substantially prevents current flow to the at least one capacitor or inductor;
 a mechanical bypass switch electrically connected in parallel to the solid state switching device and the at least one capacitor or inductor such that closing the solid-state switching device substantially prevents current flow to the at least one capacitor or inductor; and
 a control system configured to:
  determine a system contingency is occurring;
  in response to determining that the system contingency is occurring, provide a signal to the solid-state switching device that causes the solid-state switching device to close;
  determine that current is flowing through the solid-state switching device;
  in response to determining that current is flowing through the solid-state switching device, provide a signal to the mechanical bypass switch that causes the mechanical bypass switch to close; and
  in response to providing the signal to the mechanical bypass switch that causes the mechanical bypass switch to close, provide a signal to the solid-state switching device that causes the solid-state switching device to open.

14. The kit of claim 13, wherein the boost device is a capacitor bank that includes multiple capacitive components.

15. The kit of claim 13, wherein the boost device is an inductor bank that includes multiple inductive components.

16. A boost device comprising multiple portions, each of the multiple portions comprising:
 at least one capacitor or inductor;
 a solid-state switching device electrically connected in parallel to the at least one capacitor or inductor such that closing the solid-state switching device substantially prevents current flow to the at least one capacitor or inductor;
 a mechanical bypass switch electrically connected in parallel to the solid state switching device and the at least one capacitor or inductor such that closing the solid-state switching device substantially prevents current flow to the at least one capacitor or inductor; and
 a control system configured to:
  determine a system contingency is occurring;
  in response to determining that the system contingency is occurring, provide a signal to the solid-state switching device that causes the solid-state switching device to close;
  determine that current is flowing through the solid-state switching device;
  in response to determining that current is flowing through the solid-state switching device, provide a signal to the mechanical bypass switch that causes the mechanical bypass switch to close; and
  in response to providing the signal to the mechanical bypass switch that causes the mechanical bypass switch to close, provide a signal to the solid-state switching device that causes the solid-state switching device to open.

17. The boost device of claim 16, wherein the control system is configured to:
 determine that the system contingency has ended; and
 in response to determining that the system contingency has ended, providing a signal to the mechanical bypass switch that causes the mechanical bypass switch to open.

* * * * *